United States Patent Office 3,725,094
Patented Apr. 3, 1973

3,725,094
DOPED ALUMINA POWDER
Newton Levy, Jr., Ellicott City, Md., David Griffith Wirth, Jr., Golden, Colo., and Richard Raymond Rettew, Laurel, Md., assignors to W. R. Grace & Co., New York, N.Y.
No Drawing. Continuation-in-part of abandoned application Ser. No. 6,563, Jan. 28, 1970. This application Sept. 20, 1971, Ser. No. 182,230
Int. Cl. C04b 35/10
U.S. Cl. 106—62                                    2 Claims

ABSTRACT OF THE DISCLOSURE

A process for preparing aluminas containing about 10 parts per million to about 5% of a second inorganic component by mixing a solution or melt of a decomposable salt of aluminum with a salt of the desired inorganic additive and decomposing the resultant mixture in a fluid energy mill. If desired, the resultant powder can be calcined to an alpha-alumina having a crystallite size of less than 2000 angstroms with each ultimate crystallite containing the correct amount of the second component in solid solution or homogeneously dispersed within the alumina.

RELATED U.S. APPLICATION DATA

This application is a continuation-in-part of application Ser. No. 6,563, filed Jan. 28, 1970, now abandoned.

BACKGROUND OF THE INVENTION

This application relates to a process for preparing alpha alumina that has a crystallite size of about 700–1000 angstroms and a surface area of 10–12 square meters per gram and contains the desired amount, from a few parts per million to up to 5%, of a second component that is added as a dopant to the alumina.

Various second components have been used to dope aluminas, generally for a specific application or end use. Thus, it is very common to add small quantities of magnesia to alumina powders as a grain growth inhibitor. The addition of a small amount of titania has been shown to promote sintering. Yttria is frequently added as a sintering promoter and as a metalizing aid. The addition of a metalizer facilitates the bonding of metal to alumina.

The prior art processes most commonly used are wet or dry ball milling of the additive powder with the alumina powder and admixing of the decomposable salts or solutions of the additives with the alumina powder followed by some further heat treatment.

In these conventional processes, the dopants are added to the previously heat treated calcined alumina powders and therefore the ultimate crystallite size of the doped powder, even with complete distribution, is limited by the crystallite size of the original alumina.

DESCRIPTION OF THE PREFERRED EMBODIMENT

In our novel process, we prepare the alumina powders containing various additives by incorporating the additives or dopants as a soluble salt in an aqueous aluminum salt solution or melt prior to rapid dehydration and decomposition. The mixture is then subjected to a high temperature fluid energy milling process to yield an alumina powder containing a very homogeneous distribution of the additives. The powder properties are similar to those of an analogous process for preparing undoped alumina powder. Since the dopant is added prior to the production and calcination of the powder, the crystallite size of the doped powder is not limited by the crystallite size of the original alumina. We have found that this leads to excellent distribution and crystallite sizes of less than 2000 angstroms.

Incorporation of additives in an early processing step before the alumina powder is prepared, eliminates one or more subsequent processing steps of the prior art. In addition, the prior art processes suffer from impurity pickup from the blending apparatus such as ball mills. The doped alumina prepared by our process has powder properties that are the same as or are enhanced when compared to the familiar undoped alumina powder. It is not uncommon in the prior art processes to sufficiently alter the original alumina powder in such a way as to deleteriously effect the fabrication properties or to cause an alteration in the firing schedule.

The calcined powders of our invention have a surface area of 5 to 25 square meters per gram, a crystallite size of 500–2000 angstroms, and show only the alpha alumina phase in the X-ray diffraction pattern. The crystallites contain the required amount of dopant in solid solution or homogeneously dispersed with the alumina.

The first stage of our process is the preparation of the precursors for the final product. The alumina is prepared from decomposable aluminum salts such as the nitrates, chlorides, acetates, or formates, for example. These salts may be dissolved in water to form solutions or an aluminum salt may be melted and the second component added. A third method of preparing the feed is coprecipitation of the dopant with the alumina from solutions of aluminum salts as the hydroxide by the addition of ammonia or some other decomposable precipitant.

The dopant is normally added as a solution of the decomposable salt. The dopant is mixed with the aluminum in a concentration sufficient to give the desired amount in the final alumina powder. One convenient method of preparing the mixture is the simple intermixture of solutions of the decomposable salts such as a mixed solution of magnesium nitrate and aluminum nitrate, for example. The hydroxides can be prepared by coprecipitating the aluminum hydroxide and the hydroxide of the dopant material with ammonia or some other decomposable basic material.

In addition, the alumina may be doped by adding a solution or salt, in the amount necessary to provide the desired quantity of dopant in the final product, to a melt of an aluminum salt such as aluminum nitrate, for instance. Some of the aluminum salts such as the nitrate, for example, melt at temperatures below 100° C. thus facilitating the preparation of these melts.

The quantity of dopant added to the alumina will, of course, depend on the amount desired in the final product. The dopant is present in an amount from about 10 parts per million up to 5%. Magnesia, for example, is normally present in alumina in the 0.1 to 0.5 percent range.

The dopants are selected for the properties they impart to the final product. Examples of common dopants include the oxides of titanium, silicon, magnesium, yttrium, lanthanum, zirconium, strontium, and chromium, for example.

The feed may be milled as a solution, slurry, paste, co-crystallized salt, or partially dewatered solid. The solids, slurries, solutions, or gels are fed to the mill at a rate sufficient to give the desired product. When a solution is fed to an 8" steam operated fluid energy mill, for example, it is convenient to feed at a rate of 5–300 ml. per minute, preferably about 120–220 ml. per minute. Solids can be fed at a rate of 50–300 grams per minute, preferably about 100–200 grams per minute.

The most satisfactory method of expressing the feed rate is as the ratio of the pounds of steam to pounds of product. This ratio is independent of the size of the mill and is calculated by first calculating the pounds of steam per hour fed to the mill, which is calculated from the size, number of nozzles and other physical characteristics of the mill. This calculation gives the pounds of steam per hour. The feed rate of the material to be milled, as ponnds of feed per hour, is controlled to give the desired ratio of pounds of steam to pounds of product.

Our process is operable at ratios in the range of 10 to 60 preferably 20 to 40.

The high temperature fluid energy mill is most conveniently operated using steam at a temperature of 600–1500° F., preferably about 800–1000° F. The mill also operates satisfactorily with air, however, In a typical preparation, a solution of aluminum nitrate containing a sufficient quantity of magnesia as magnesium nitrate to give a product containing up to about 5% magnesia is fed to an 8″ fluid energy mill at a rate of 250 ml. per minute. Steam is introduced into the mill at a pressure of 130 p.s.i. and an inlet temperature of 1400° and an outlet temperature of 800° F. The feed is injected into the mill with air under a pressure of 100–200 p.s.i.

One of the advantages of our process is the elimination of the washing as a process step in the preparation where the precipitated hydroxides are fed to the mill, for example, and the avoidance of introduction of impurities into the alumina. No impurities are introduced into the alumina because of the choice of the pure alumina precursors and pure dopant precursors, or from subsequent processing steps, as ball milling. The preferred feed stocks of the process of our invention are the aluminum salts, hydrous oxides, hydrogels, sols and solution and the comparable salts, hydrous oxides, hydrogels, sols and solutions of the dopant materials. When a precipitant is used to prepare a coprecipitate, for example, any decomposable base is acceptable but ammonia is preferred because of its availability, cost, and the complete decomposition of ammonium salts at the temperature of operation of the fluid energy mill.

In the second step of our process, the product from the fluid energy mill is calcined to complete formation of the alpha alumina phase containing the homogeneously dispersed or solid solutions of the dopant. The crystallite size of the alumina is below 2000 angstroms and in most cases, less than 1000 angstroms. Each of the ultimate crystallites contain the correct amount of dopant in solid solution or homogeneously dispersed with the alumina.

Our invention is further illustrated by the following specific but non-limiting examples.

EXAMPLE 1

This example illustrates the enhanced sinterability of magnesia doped alumina prepared by the process of the instant application when compared to a product prepared by the process of the prior art.

In the prior art process, commercial alpha alumina powder was dry ball milled with reagent grade magnesium carbonate powder to contain 0.10 weight percent MgO on an $Al_2O_3$ basis.

The product prepared according to the process of the instant application was prepared from mixed solutions of aluminum and magnesium nitrate. These solutions are prepared to contain 8 weight percent solids as oxides and 0.1 weight percent MgO on an alumina basis. The solution was then rapidly decomposed and dehydrated in a high temperature fluid energy mill operated at a temperature of 800° F. The product was calcined at 900° C. for two hours, cold pressed and fired in air for 2 hours at temperatures of 1250, 1350, 1400, and 1450° C. The product prepared by the method of prior art was designated sample A and the product prepared by the process of this invention was designated sample B. A comparison of the densities of the two materials is shown in the table below:

TABLE I

| | Fired Densities, g./cc. | | | |
|---|---|---|---|---|
| | 1,250° C. | 1,350° C. | 1,400° C. | 1,450° C. |
| Sample A | 3.29 | 3.90 | 3.91 | 3.95 |
| Sample B | 3.78 | 3.94 | 3.94 | 3.97 |

It is apparent from these data that the process of the instant application consistently prepares a product with a higher fired density at lower temperatures than the process of the prior art. The product prepared according to the process of the instant application had a fired density of 3.94 grams per cc. after firing at 1350° C. This advantage was maintained in the samples that were fired at 1400 and 1450° C.

EXAMPLE 2

This example illustrates the effect of the various dopants on the surface area and crystallite size of the powders. Each of these samples contained 0.10 weight percent of the dopant (alumina basis) and were calcined at 900° C. for two hours in air. The result is shown in Table II below:

TABLE II

| Dopant | Surface area, m.²/g. | $D_{113}$, A. |
|---|---|---|
| $La_2O_3$ | 11.0 | 900 |
| SrO | 9.7 | 1,300 |
| $ZrO_2$ | 9.9 | 1,000 |
| MgO (sample B) | 6.1 | 1,600 |
| Undoped | 10.6 | 1,100 |

It is apparent the doped powders have similar surface areas and crystallite sizes as the undoped powder.

What is claimed is:

1. An alumina powder composed of crystallites of less than 2000 A. crystallite size, having a surface area of 5–25 square meters per gram containing from about 10 parts per million to about 5 percent of a second inorganic oxide selected from the group consisting of the oxides of titanium, silicon, magnesium, yttrium, lanthanum, zirconium, strontium, and chromium, in which each ultimate crystallite contains the correct amount of said second oxide homogeneously dispersed in the alumina.

2. The composition according to claim 1 wherein the alumina powder is composed of crystallities having the size of 500 to 2000 A.

References Cited

UNITED STATES PATENTS

| 3,026,210 | 3/1962 | Coble | 106—65 |
| 3,274,008 | 9/1966 | Braunwarth et al. | 106—65 |
| 3,311,482 | 3/1967 | Klingler et al. | 106—65 |
| 3,514,252 | 5/1970 | Levy et al. | 23—22 |

JAMES E. POER, Primary Examiner

U.S. Cl. X.R.

106—39, 65